United States Patent [19]

Figone et al.

[11] Patent Number: 5,441,262
[45] Date of Patent: Aug. 15, 1995

[54] MULTIDIMENSIONAL PUZZLE

[75] Inventors: Frank M. Figone; Eric M. Seubert, both of Alameda County, Calif.

[73] Assignee: GFS Creations, San Mateo, Calif.

[21] Appl. No.: 180,659

[22] Filed: Jan. 12, 1994

[51] Int. Cl.[6] .......................... A63F 9/12; G09B 1/06
[52] U.S. Cl. .................. 273/157 R; 434/151; 434/152; 434/159
[58] Field of Search .................. 273/157 R; 434/130, 434/131, 132, 151, 152, 159, 160, 171, 172

[56] References Cited

U.S. PATENT DOCUMENTS

| | | | |
|---|---|---|---|
| 1,586,960 | 6/1926 | Bowen | 434/159 |
| 2,535,619 | 12/1950 | Wright | 434/151 |
| 2,674,813 | 4/1954 | Hutchinson | 434/152 |
| 3,495,833 | 2/1970 | Wesley | 273/157 R |
| 4,937,181 | 10/1989 | Rogers | 434/150 |

FOREIGN PATENT DOCUMENTS 104203  2/1917  United Kingdom ............ 273/157 R

OTHER PUBLICATIONS

U.S. Puzzle Advertisement, exact date unknown.

Primary Examiner—William H. Grieb
Attorney, Agent, or Firm—Flehr, Hohbach, Test, Albritton & Herbert

[57] ABSTRACT

A multidimensional puzzle. The puzzle includes a plurality of three-dimensional first object pieces having a contoured front surface. The object pieces are each representative of a thing with the contoured front surface having a shape identified with the thing represented by the object piece. A background defines a plurality of recesses each shaped to receive one of the object pieces with the contoured surface projecting from the recess. The background includes a plurality of second pieces. The puzzle also includes identification indicia associated with each of the recesses identifying one of the things represented by the object pieces to thereby indicate which of the object pieces the recess is shaped to receive.

19 Claims, 3 Drawing Sheets

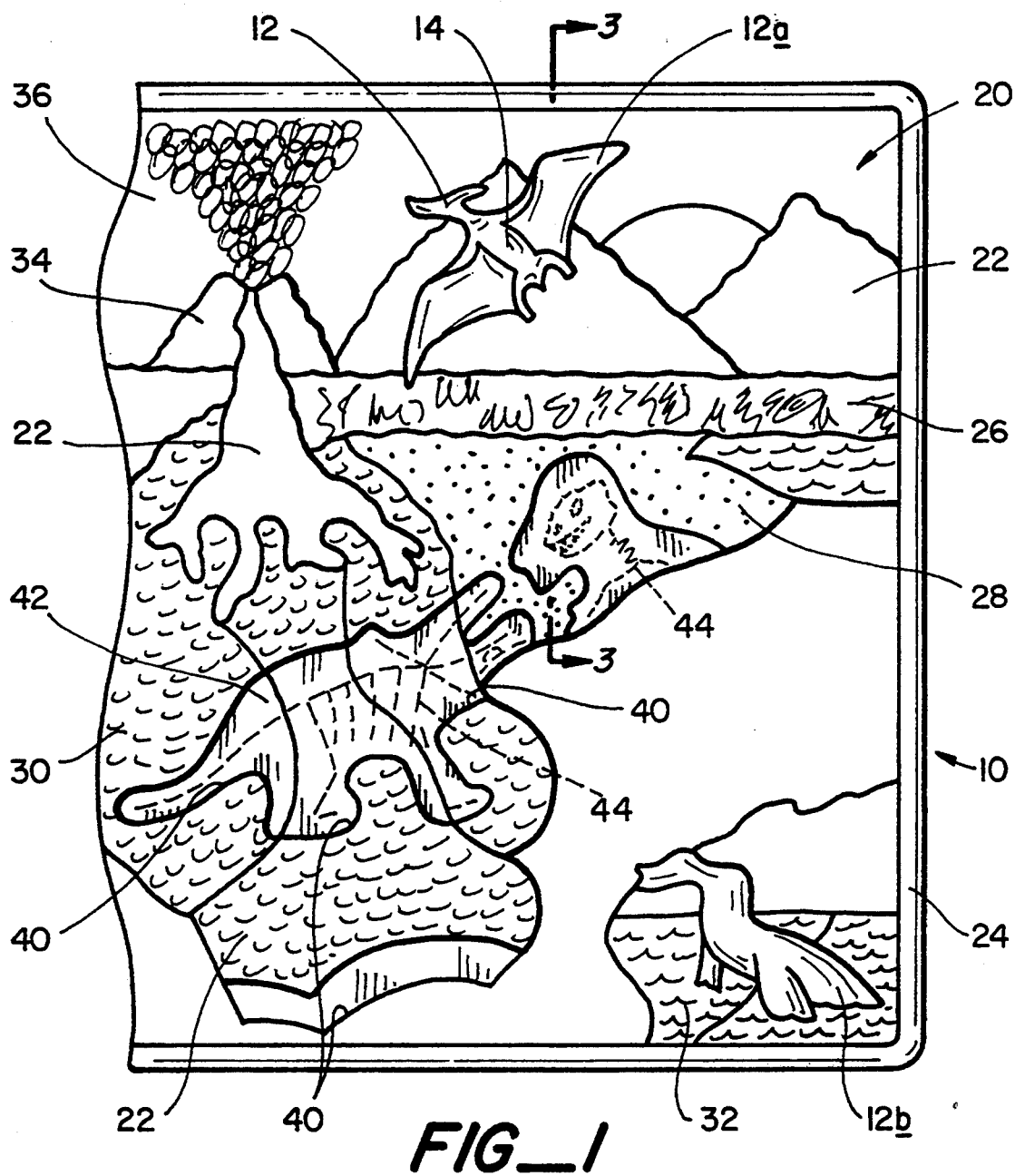
FIG_1
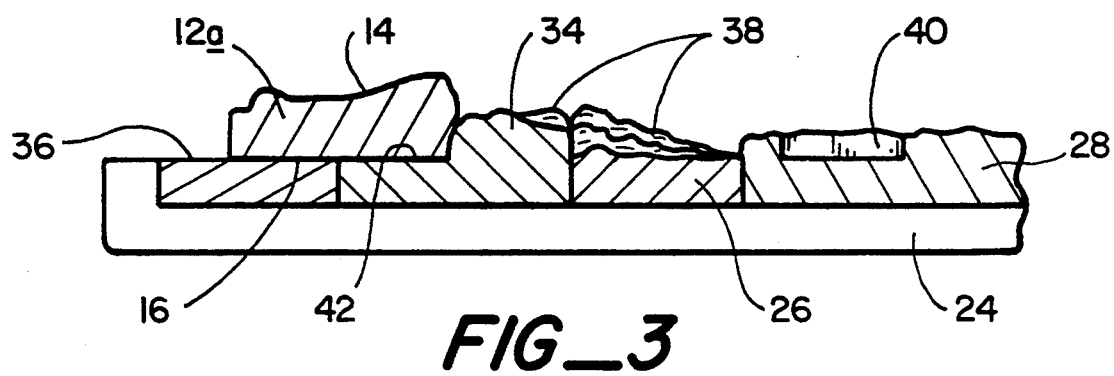
FIG_3

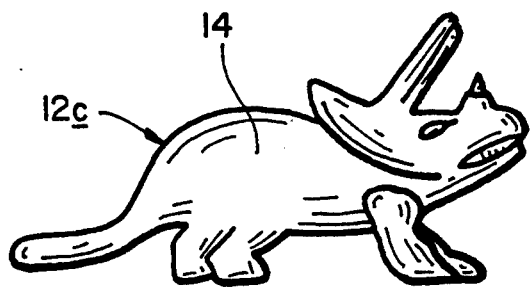
FIG_2A
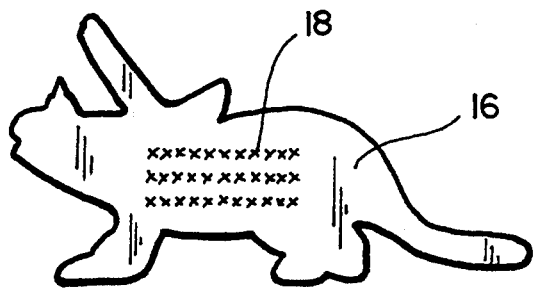
FIG_2B
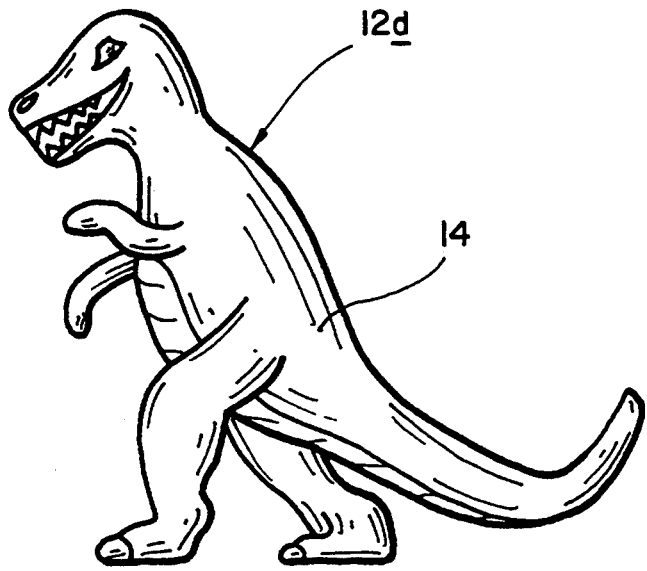
FIG_2C
FIG_2D
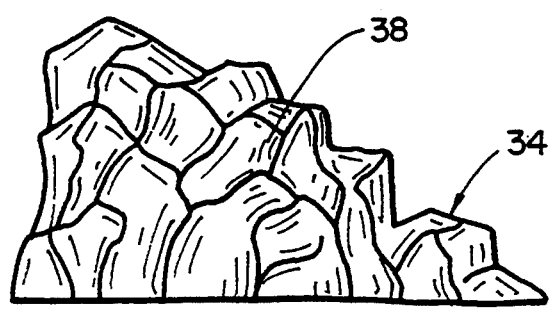
FIG_2E

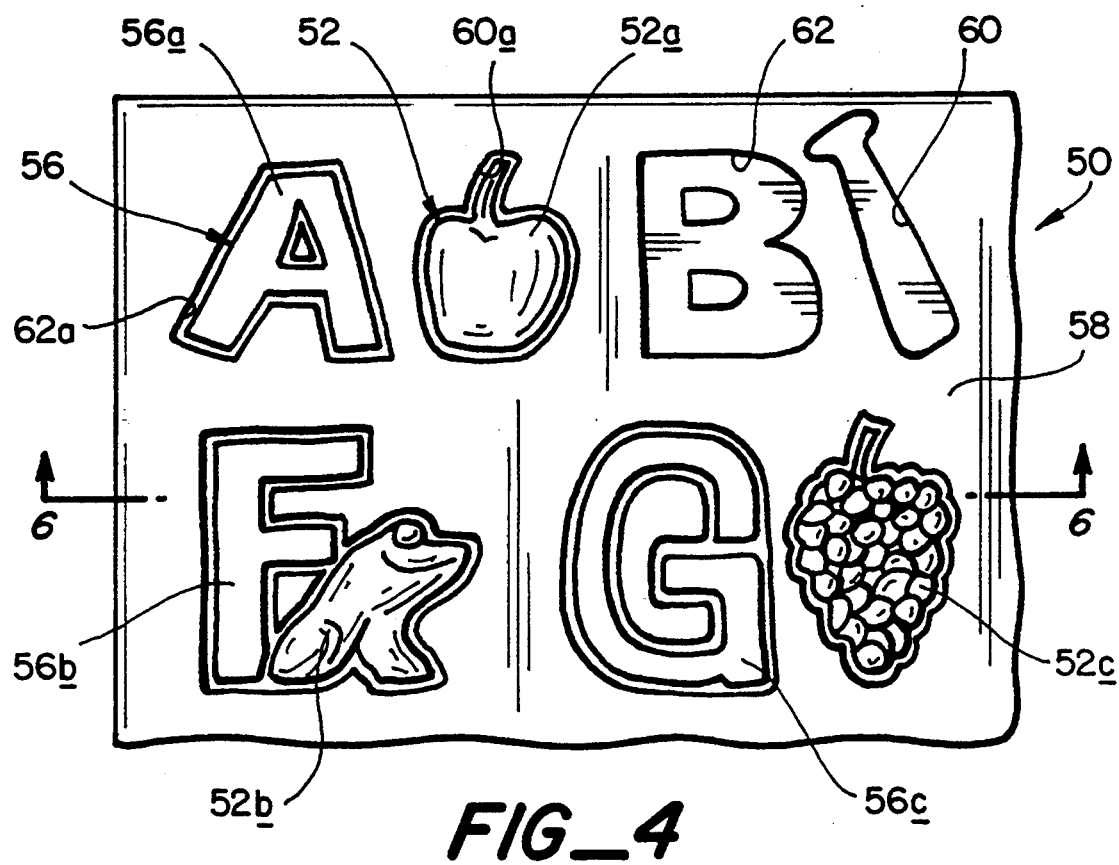
FIG_4
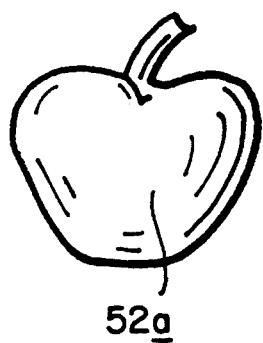
FIG_5A
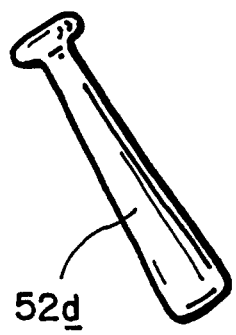
FIG_5B
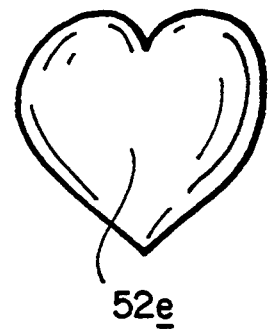
FIG_5C
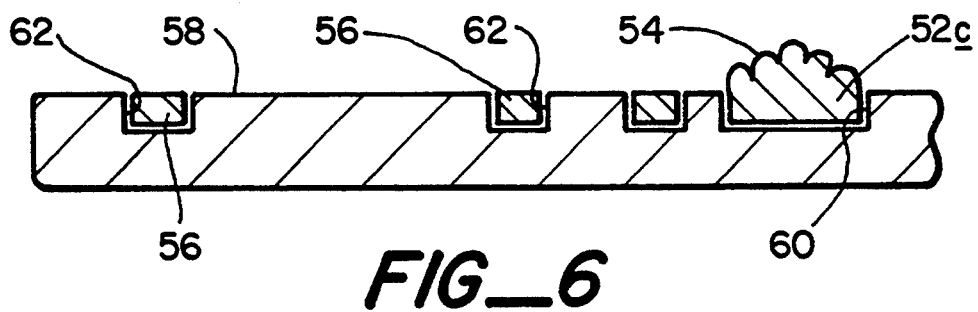
FIG_6

MULTIDIMENSIONAL PUZZLE

BRIEF SUMMARY OF THE INVENTION

This invention relates generally to a puzzle having a plurality of pieces and, more particularly, to a multidimensional puzzle.

BACKGROUND OF THE INVENTION

For children, learning is often a tedious and difficult process. Repetition, one technique typically used in learning, may try the child's patience and cause boredom and frustration. Learning through the association of new ideas with retained knowledge is easier and more interesting for the child.

Most available puzzles include flat pieces which may for example represent the individual states. The flat pieces are placed in abutting relationship with one another to form the United States. The puzzles may include flat pieces representing mountains, lakes and oceans which are assembled with the states. The current puzzles are designed to have the pieces lay on one plane with their edges forming the borders for the next adjacent piece. The problem with this approach is that when a piece, for example the Rocky Mountains, is removed from the puzzle, the pieces representing the states traversed by the mountains no longer resemble the actual shape of the state. The child is then unsure of the true shape of the state. The state pieces include the names of the state and in some instances may include a picture of an item linked with the state. The problem with a picture is that it is not something tangible that the child can pick up and physically place in the correct state. True association learning requires the physical process of connecting the new object to the known object.

One available puzzle of the United States includes several three-dimensional objects representing items of interest in various states such as a lobster for Maine, a potato for Idaho, the Statue of Liberty for New York, etc. The objects are inserted into recesses formed in the flat pieces representing the individual states. The three-dimensional objects and the recesses are shaped so that each object may only be inserted into one recess. By physically inserting the objects into the puzzle, the child begins to associate the items of interest with the particular state. For example, the child learns that lobsters are associated with Maine by fitting the object shaped as a lobster into the recess located in the state of Maine. Thus, the puzzle assists the child in learning information about the United States, such as, most lobsters are harvested in Maine, the Statue of Liberty is located in New York and more potatoes are grown in Idaho than any other state.

A multidimensional puzzle, such as the puzzle of the United States, is useful in association learning since the child physically places the pieces in the puzzle. Providing the recesses of a multi-dimensional puzzle with information identifying the subjects embodied in the three-dimensional objects would further enhance the learning process. The child could use the information to identify one or more of the objects and determine where the objects should be placed. A puzzle with indicia identifying the subject of the object pieces is desirable.

In addition to the individual states, current puzzles may represent an illustration such as a dinosaur, cartoon character, a landscape or another scene of interest with the flat pieces providing portions of the illustration. A multidimensional puzzle in which the flat pieces were provided with a contoured surface would be particularly useful for association learning. For example, a puzzle illustrating various animals in their natural habitat could include pieces with contoured surfaces representing areas of the habitat such as foliage, sand and water. The physical process of touching the contoured surface enhances the child's perception of the illustration, helping the child to learn the habitat of a particular animal. Moreover, the contoured puzzle pieces provide a vivid image which captures and retains the child's attention. Thus, a multidimensional puzzle having three-dimensional background pieces with a contoured front surface is desirable.

OBJECTS AND SUMMARY OF THE INVENTION

It is a primary object of this invention to provide a multidimensional puzzle with removable three-dimensional object pieces which increase educational value through association learning.

It is another object of the invention to provide unique positions for each three-dimensional object.

It is yet another object of the invention to provide the unique positions with information identifying the subjects embodied in the three-dimensional objects which may be used when determining where to place the objects.

It is an additional object of the invention to provide a multidimensional puzzle with pieces having a contoured surface for enhancing association learning and for capturing and retaining a child's attention.

It is a further object of the invention to provide a multidimensional puzzle having multiple layers with the pieces of one layer defining recesses for receiving the pieces of the next layer.

A more general object of the invention is to provide a puzzle which facilitates the learning process and which entertains the child.

In summary, this invention provides a multidimensional puzzle which is particularly suitable for use in association learning. The puzzle includes a plurality of three-dimensional object pieces having a contoured front surface representative of the subject embodied in the object piece and a flat or concave back surface. A background defines a plurality of recesses each shaped to receive one of the object pieces with the contoured surface projecting from the recess. The background has a plurality of background pieces. The puzzle also includes indicia, associated with each recess, identifying the subject of one of the object pieces. The identification indicia for each recess is provided by at least one of the background pieces. A child may use the identification indicia to determine which of the object pieces fits into each recess.

In another embodiment, the multidimensional puzzle of this invention includes a plurality of three-dimensional background pieces forming an image and a plurality of three-dimensional object pieces. The background pieces have a contoured background surface which is representative of a portion of the image. Similarly, the object pieces have a contoured object surface with a shape associated with the subject of the object piece. The contoured surface of selected background pieces is formed with a recessed portion, with the recessed portions of adjacent background pieces defining a plurality of recesses shaped to receive one of the object pieces.

Additional objects and features of the invention will be more readily apparent from the following detailed description and appended claims ween taken in conjunction with the drawings.

BRIEF DESCRIPTION OF THE DRAWINGS

FIG. 1 is a top plan view of a portion of a multidimensional dinosaur puzzle in accordance with the invention.

FIGS. 2A–2E show representative three-dimensional object pieces and background pieces for the puzzle of FIG. 1.

FIG. 3 is a cross sectional view taken along line 3—3 in FIG. 1.

FIG. 4 is a top plan view of a portion of a multidimensional letter puzzle in accordance with another embodiment of the invention.

FIGS. 5A–5C show representative three-dimensional objects for the puzzle of FIG. 4.

FIG. 6 is a cross sectional view taken along line 6—6 in FIG. 4.

DETAILED DESCRIPTION OF THE INVENTION

Reference will now be made in detail to the preferred embodiment of the invention, which is illustrated in the accompanying figures. Turning now to the drawings, wherein like components are designated by like reference numerals throughout the various figures, attention is directed to FIGS. 1 to 3.

A multidimensional puzzle 10 incorporating the invention is shown particularly in FIG. 1. The puzzle 10, which is particularly suitable for use in association learning, includes a plurality of three-dimensional first object pieces, generally designated 12. In the present embodiment, the object pieces are each representative of a dinosaur as for example pteranodon 12a, elasmosaurus 12b, triceratops 12c (FIGS. 2A, 2B) and tyrannosaurus 12d (FIG. 2C). The dinosaur pieces 12 have a contoured front surface 14 which shows the general body structure of the dinosaur. The three-dimensional object pieces provide a child with a better understanding of the dinosaur's appearance since the child may handle the object piece, touching contoured surface 14. The three-dimensional object pieces, which are similar to toys, also entertain the child and assist learning by retaining the child's interest.

Object pieces 12 have a back surface 16 which is preferably provided with relevant information, generally designated 18 in FIG. 2B, about the subject embodied in the object piece. In the present embodiment, relevant information such as the dinosaur name and pronunciation, the length and weight of the dinosaur and whether the dinosaur was a meat eater or a plant eater is printed on back surface 16. Reproducing relevant information on the back surface of object pieces 12 provides a useful tool which helps the child learn about the dinosaur. When working with puzzle 10, information about the dinosaurs is readily available to the child by turning over object piece 12. Handling the contoured object piece helps the child to associate the information with the dinosaur. In the present embodiment, the information is printed on back surface 16. However, information may be provided by other known means as, for example, applying a sticker to back surface 16 or molding the object piece with the information provided on the back surface.

Puzzle 10 includes a background, generally designated 20, which in the present embodiment is provided by a plurality of background pieces 22 supported on a base 24. As is shown particularly in FIGS. 1, 2D and 2E, in the present embodiment the background illustrates a landscape representative of the habitat of the dinosaurs, with three-dimensional background pieces 22 representing a foliage region 26, a sand region 28, a lava region 30, a water region 32, a mountain region 34 and a sky region 36. Background pieces 22 have a contoured front surface 38 with a shape identified with the region represented by the piece. For example, front surface 38 of the background pieces in foliage region 26 (FIG. 2D) has contours of grass, trees and bushes and the background pieces in mountain region 34 (FIG. 2E) have contours of rocks. Similarly, the contoured surface of water region 32 is formed with Apples while contoured surface 38 of lava region 30 is roughly textured to represent lava. The three-dimensional background pieces provide a more realistic image than flat pieces having a color identified with the represented regions (i.e. green for foliage, tan for sand, blue for water, black for lava, etc.). Touching contoured surface 38 of the background pieces helps the child associate the habitat illustrated in background 20 with the dinosaurs embodied in object pieces 12. The vivid image provided by the three-dimensional background pieces is also more entertaining for the child.

Selected background pieces 22 have a recessed portion 40, shown in FIG. 1. When background 20 is assembled, recessed portions 40 of adjacent background pieces are combined to form a plurality of recess 42 shaped to receive object pieces 12. The puzzle 10 is assembled in layers by first arranging background pieces 22 to provide recesses 42 for the object pieces. Once background 20 is assembled, the child then picks up a dinosaur piece and positions it in one of the recesses 42. Preferably, the recesses are shaped so that any one of the object pieces will fit in only one recess 42. As is shown particularly in FIG. 3, when an object piece such as pteranodon 12a is positioned in recess 42, contoured surface 14 of the dinosaur piece projects from background 20. The completed three-dimensional puzzle has a more animated image than a flat puzzle.

Multidimensional puzzle 10 of the invention also includes identification indicia associated with each recess identifying the subject of object pieces 12. In the present embodiment, the identification indicia is provided by an imprint 44 in recess 42 of the skeletal structure of the dinosaurs represented by object pieces 12. Similar to a fossil, the skeletal imprint identifies the dinosaur and may be used to determine which object piece 12 fits in recess 42. If the child is familiar with the skeletal structure of one or more of the dinosaurs, as for example the tyrannosaur or other popular dinosaurs, the child may use skeletal imprint 44 to determine which dinosaur piece fits in recess 42. For other dinosaurs, the child may complete the puzzle by fitting the object pieces into an appropriately sized recess. Alternatively, the child may use the shape of the skeletal imprint to select the dinosaur piece 12 which fits into the recess as the imprint includes many details which are not apparent from the recess outline. By physically placing object pieces 12 into recesses 42, the child will associate the skeletal structure with the dinosaur. The child will begin to use more of the skeletal imprints to assemble the puzzle as the child learns about the dinosaurs.

Another embodiment of a multidimensional puzzle 50 in accordance with the invention is shown in FIGS. 4–6. Puzzle 50, depicting the alphabet, includes a plurality of three-dimensional first object pieces 52 representative of a variety of things as for example an apple 52a, a frog 52b, grapes 52c, a baseball bat 52d (FIG. 5B) and a heart 52e (FIG. 5C). The object pieces 52 have a contoured surface 54 formed in the shape of the thing represent by the object pieces (i.e. an apple, baseball bat, frog, etc.). The realistic image provided by contoured surface 54 enhances the learning process and entertains the child. In the present embodiment, puzzle 50 also includes a plurality of second pieces 56 each associated with one of object pieces 52. As is shown in FIG. 4, second pieces 56 are shaped as the letters of the alphabet, for example piece "A" 56a, piece "F" 56b and piece "G" 56c, with each letter-shaped piece representing the first letter in the name of the thing represented by object piece 52 (i.e. "A" for apple 52a, "B" for bat 52b, etc.).

The puzzle also includes a background, generally designated 58, with a plurality of first recesses 60 each shaped to receive one object piece 52 and a plurality of second recesses 62 each associated with one first recess 60 and shaped to receive one background piece 56. The first and second recesses may be separate recesses positioned side by side, such as first recess 60a and second recess 62a. Alternatively, first and second recesses 60 and 62 may be connected so that when the puzzle is assembled, the object piece overlaps the letter-shaped piece such as pieces 52b and 56b. As is shown in FIG. 6, contoured surface 54 of the object piece projects from background 58 when the object piece is positioned in first recess 60. The assembled three-dimensional puzzle is more likely to capture the child's interest and retain the child's attention than a flat puzzle.

As with the previously described embodiment, puzzle 50 includes indicia associated with each first recess 60 identifying the thing represented by one of the object pieces. The indicia is provided in the present embodiment by letter-shaped pieces 56 which represent the first letter in the name of the subject of object piece 52. It should be understood that in some instances the shape of letter-shaped second recess 62 may be clearly discernable, in which case the second recess would also provide indicia identifying the subject of object piece 52. Puzzle 50 is typically assembled by first inserting letter-shaped pieces 56 into second recesses 62. The child may easily determine where the letter-shaped pieces should be placed since the shape of second recess 62 is often identical to that of letter-shaped piece 56.

When one or more letter-shaped pieces 56 have been placed in the second recesses the child may begin to fit object pieces 52 into first recesses 60. If the child recognizes a letter, the child may use letter-shaped piece 56 (or second recess 62) to determine which object piece 52 fits into the associated first recess 60. For example, if the child knows that the letter "A" relates to an apple, the child will place the apple-shaped object piece 52a into first recess 60a. The child may complete the puzzle by using the relative shapes of the outlines of object pieces 52 and first recesses 60 to fit the remaining object pieces into the appropriate first recess. By physically picking up the object pieces and placing them in first recesses 60, the child will gradually associate letter-shaped piece 56 with the subject represented by object piece 52. Eventually, the child will have learned to assemble the entire puzzle using the letter-shaped pieces to select the correct object piece for first recesses 60.

As is apparent from the forgoing discussion, the multidimensional puzzle of this invention provides a valuable tool in association learning as the child combines retained knowledge with new knowledge. The identification indicia, skeletal imprint 44 and letter-shaped pieces 56 and recesses 62, are useful in determining which object piece fits into each recess. If unfamiliar with the indicia, the child will learn to recognize the indicia through true association learning as the child physically puts the puzzle together. The contoured surfaces of the background and object pieces enhance the learning process since the child uses the senses of sight and touch in assembling the puzzle. Physically arranging the three-dimensional background pieces provides the child with a better understanding of the different regions represented by the background, such as the foliage, sand and water regions.

Although the invention has been described in relation to a dinosaur puzzle 10 and an alphabet puzzle 50, it should be understood that the multidimensional puzzle may be provided in many other configurations. Similarly, object pieces 12 and 52 may be replaced by pieces representing other subjects. Additionally, the pieces of the multidimensional puzzle may be formed of a pliant material or a rigid material.

What is claimed is:

1. A multidimensional puzzle comprising:
 a plurality of three-dimensional object pieces having a front contoured surface, a back surface, and a peripheral edge extending between said contoured surface and said back surface, said object pieces each being representative of a thing with said contoured surface having a shape identified with said thing;
 a background defining a plurality of recesses each individually shaped to receive a selected one of said object pieces with said back surface positioned and said peripheral edge at least partially seated in said recess and said contoured surface projecting from said recess, said background including a plurality of second pieces; and
 each of said recesses having identification indicia separate from the shape of said object pieces identifying said thing represented by said selected one of said object pieces to thereby indicate which of said object pieces said recess is shaped to receive.

2. The multidimensional puzzle of claim 1 wherein, said object pieces are representative of a creature and said identification indicia is an imprint of the skeletal structure of said creature.

3. The multidimensional puzzle of claim 1 wherein, said identification indicia is provided by at least one of said second pieces having a shape representative of a letter of the alphabet, said letter forming part of the name of one of said things to thereby indicate which of said object pieces said recess is shaped to receive.

4. The multidimensional puzzle of claim 3 wherein, said background includes a plurality of second recesses shaped to receive said second pieces and said identification indicia is provided by selected ones of said second recesses having a shape substantially similar to said second pieces.

5. The multidimensional puzzle of claim 1 wherein, said background is configured to illustrate an image associated with said object pieces and said second pieces have a front contoured surface representative of a portion of said image.

6. The multidimensional puzzle of claim 1 wherein, selected ones of said second pieces have a recessed area shaped to receive at least a portion of one of said object pieces, said recesses being defined by at least one of said recessed areas of said second pieces.

7. The multidimensional puzzle of claim 1 wherein, said second pieces define said background.

8. A multidimensional puzzle comprising:
a plurality of three dimensional background pieces forming an image, said background pieces having a contoured background surface with a shape representative of a portion of said image, said contoured background surface of selected ones of said background pieces having a recessed area;
a plurality of three dimensional object pieces each representative of a thing, said object pieces having a contoured object surface having a shape associated with said thing; and
a plurality of recesses each defined by said recessed areas of at least two adjacent background pieces, said recesses each being individually shaped to receive a selected one of said object pieces with said contoured object surface projecting from said contoured background surface.

9. The multidimensional puzzle of claim 8, further comprising
identification indicia associated with each of said recesses identifying one of said things represented by said object pieces to thereby indicate which of said object pieces said recess is shaped to receive, said identification indicia being provided by at least one of said background pieces.

10. The multidimensional puzzle of claim 8 wherein, said object pieces are each representative of a creature and said image provided by said background pieces is representative of the habitat of said creatures.

11. The multidimensional puzzle of claim 8 wherein, said object pieces have a back surface opposite said contoured object surface with indicia identifying said thing represented by said object piece.

12. The multidimensional puzzle of claim 8 wherein, said object pieces are each representative of a dinosaur.

13. The multidimensional puzzle of claim 8 wherein, said background pieces are each representative of one of a foliage region, a water region, a sand region, a mountain region, a lava region and a sky region.

14. The multidimensional puzzle of claim 8, further comprising
a base having a raised border defining an area shaped to receive said background pieces when said background pieces are arranged to form said image.

15. A multidimensional puzzle comprising:
a plurality of three-dimensional first pieces each representative of a thing and having a contoured surface with a shape associated with said thing, a first back surface spaced from said contoured surface, and a first peripheral edge extending between said contoured surface and said first back surface;
a plurality of second pieces each having a front surface, a second back surface spaced from said front surface and a second peripheral edge extending between said front surface and said second back surface, each of said second pieces being paired with one of said first pieces; and
a background having a plurality of first recesses each individually shaped to receive a selected one of said first pieces with said first back surface and at least a portion of said first peripheral edge positioned in said first recess and said contoured surface projecting from said background and a plurality of second recesses each associated with one of said first recesses and individually shaped to receive a selected one of said second pieces with said second back surface and at least a portion of said second peripheral edge positioned in said second recess.

16. The multidimensional puzzle of claim 15 wherein, said second pieces are configured to provide identification indicia identifying one of said things represented by said first pieces such that when said second pieces are positioned in said second recesses, said second pieces indicate which of said first pieces the associated one of said first recesses is shaped to receive.

17. The multidimensional puzzle of claim 16 wherein, said second recesses have a shape substantially similar to said second pieces and said identification indicia is provided by selected ones of said second recesses.

18. The multidimensional puzzle of claim 15 wherein, said second pieces each have a shape representative of a letter of the alphabet, said letter forming part of the name of said thing represented by the associated one of said first pieces.

19. The multidimensional puzzle of claim 15 wherein, selected ones of said first recesses and the associated ones of said second recesses are connected such that when said first and second pieces are positioned in said first and second recesses, respectively, said first piece extends partially across said second piece.

\* \* \* \* \*